United States Patent
Oketani et al.

(10) Patent No.: US 6,428,909 B2
(45) Date of Patent: Aug. 6, 2002

(54) ALUMINUM ALLOY MEMBER AND PRODUCTION METHOD THEREOF

(75) Inventors: Hiroyuki Oketani; Hiroyuki Uchida; Shigeyuki Hara; Yuji Marui, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/779,736

(22) Filed: Feb. 9, 2001

(30) Foreign Application Priority Data

Feb. 9, 2000 (JP) .......................................... 2000-038027

(51) Int. Cl.⁷ ............................ B32B 15/00; C22F 1/043
(52) U.S. Cl. ............... 428/650; 29/888.04; 29/888.044; 29/888.048; 29/888.061; 148/523; 148/535; 148/549; 428/646; 428/925; 428/926
(58) Field of Search ................................. 428/646, 650, 428/925, 926; 148/523, 535, 537, 549; 29/888.04, 888.044, 888.048, 888.049, 888.06, 888.061

(56) References Cited

U.S. PATENT DOCUMENTS 4,028,062 A * 6/1977 Hetke .......................... 428/926
4,483,286 A * 11/1984 Herrmann et al. ........ 29/888.04

FOREIGN PATENT DOCUMENTS

JP          A2-104465        4/1990

* cited by examiner

Primary Examiner—Robert R. Koehler
(74) Attorney, Agent, or Firm—Birch, Stewart, Kolasch & Birch, LLP

(57) ABSTRACT

To provide an aluminum alloy member having a high machinability while keeping a sufficient mechanical strength and a sufficient wear resistance, and a method of producing the aluminum alloy member. In an aluminum alloy member formed from an aluminum-silicon alloy by casting, eutectic silicon grains are exposed from at least part of an exposed plane of the aluminum alloy member. A coating layer having a thickness nearly equal to or thinner than a diameter of each of the eutectic silicon grains is formed on the exposed plane from which the eutectic silicon grains are exposed.

28 Claims, 4 Drawing Sheets

ALUMINUM ALLOY MEMBER AND PRODUCTION METHOD THEREOF

BACKGROUND OF THE INVENTION

1. Field of the Invention

The present invention relates to an aluminum alloy member and a method of producing the aluminum alloy member. More particularly, the present invention relates to an aluminum alloy member suitable for a piston, cylinder, or the like of an internal combustion engine, requiring high wear resistance as well as high mechanical strength, and a method of producing the aluminum alloy member.

2. Description of Background Art

An internal combustion engine for a vehicle is requires high mechanical strength, light weight, a low thermal expansion coefficient, and the like. To meet such requirements, main members of an internal combustion engine have been formed from an aluminum alloy by casting. A member having a sliding plane, such as a piston or a cylinder, however, is required to have high wear resistance as well as high mechanical strength and the like. To meet such requirements, for example, a cylinder liner made from cast iron has been press-fitted to a piston sliding plane of a cylinder block, or a sliding plane has been subjected to hard alumite treatment.

The use of the cylinder liner has a problem in complicating the production steps thereof and the recycling steps thereof, and the hard alumite treatment has a problem in degrading the dimensional accuracy of the sliding plane. To solve these problems, Japanese Patent Laid-open No. Hei 2-104465 discloses a technique, in which a piston or a cylinder is produced by casting an aluminum-silicon based alloy material having a hyper-eutectic composition containing 15 to 30 wt % of silicon, and a sliding plane of the piston or cylinder is polished to expose primary crystal silicon grains from the exposed plane, thereby improving the wear resistance of the sliding plane of the piston or cylinder.

The above-described technique has a problem. Since the primary crystal silicon grains have excellent wear resistance but have poor machinability such as the mechanical cutting characteristics, it takes a long time to machine the member formed by casting, thus resulting in an increase in the cost of manufacturing.

SUMMARY AND OBJECTS OF THE INVENTION

An object of the present invention is to solve the above-described problems of the prior art, and to provide an aluminum alloy member having high machinability while keeping sufficient mechanical strength and sufficient wear resistance, and a method of producing the aluminum alloy member.

To achieve the above object, the present invention provides the following aluminum alloy member and method of producing the aluminum alloy member.

(1) The aluminum alloy member, which is formed from an aluminum-silicon alloy by casting, includes eutectic silicon grains that are exposed from part of an exposed plane of the aluminum alloy member.

(2) The method of producing an aluminum alloy member, which is formed from an aluminum-silicon alloy, includes the steps of: casting an aluminum-silicon alloy having an eutectic composition or a hypo-eutectic composition, to form an aluminum alloy raw material; machining the surface of the aluminum alloy raw material formed by casting; etching the machined surface, to expose eutectic silicon grains therefrom; and forming a coating layer on the surface from which the eutectic silicon grains are exposed.

According to the aluminum alloy member having the feature (1), since eutectic silicon grains, which have a machinability higher than that of primary crystal silicon grains while keeping a sufficient wear resistance, are exposed from a sliding plane, it is possible to improve the machinability of the aluminum alloy member while keeping a sufficient wear resistance thereof.

According to the production method having the feature (2), since eutectic silicon grains, which have a machinability higher than that of primary crystal silicon grains while keeping a sufficient wear resistance, are exposed from a sliding plane, it is possible to improve the wear resistance of the aluminum alloy member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the present invention will be described in detail by way of an embodiment in which an aluminum alloy member of the present invention is applied to a piston, formed by casting, of an internal combustion engine for a vehicle.

First, an aluminum-silicon based alloy material having an eutectic composition containing silicon in an amount of about 12.0 wt % (for example, 11.7 wt %) and less than an amount (15.0 wt % or more) of silicon in a conventional aluminum-silicon alloy having a hyper-eutectic composition is prepared. The alloy material may contain other metal components such as copper and magnesium.

Figure 1:
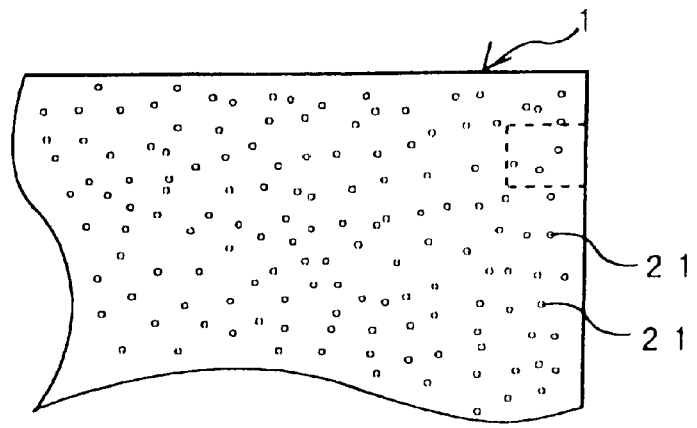
FIG. 1 is a sectional view of a piston to which the present invention is applied.

The aluminum-silicon based alloy material is melted and is poured in a mold for forming a piston having a desired shape, to be solidified, whereby a piston raw material made from an eutectic aluminum-silicon based alloy is formed by casting. As shown in FIG. 1, eutectic silicon grains 21 are precipitated in the piston raw material 1. The diameter of each of the eutectic silicon grains 21 is in a range of 1 to 5 µm and the content of the eutectic silicon grains is in a range of 10 to 13 wt %.

Figure 2:
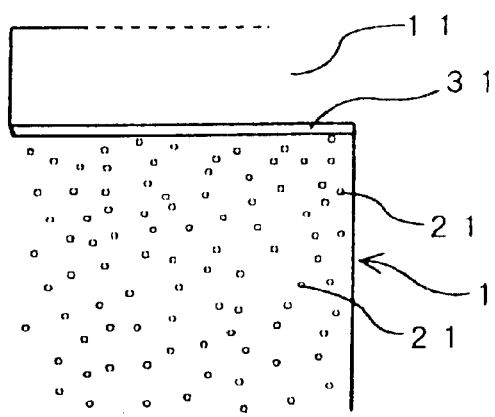
FIG. 2 is a sectional view of the piston which is the same as that shown in FIG. 1 except that the piston has been subjected to mechanical cutting.

As shown in FIG. 2, a ring groove 11 in which a piston ring is to be mounted is formed in an upper portion of the side surface of the piston raw material 1 by mechanical cutting. According to this embodiment, at this time, primary crystal silicon grains are not precipitated in the portion to be cut, and only the eutectic silicon grains 21 that are easier to be cut as compared with the primary crystal silicon grains are precipitated in the portion to be cut, with a result that it is possible to significantly shorten the time required for cutting as compared with the prior art. Upon mechanical cutting, a relatively soft α-phase 31 is formed in such a manner to cover the surface of the ring groove 11 by microplastic flow caused by mechanical cutting.

Figure 3:
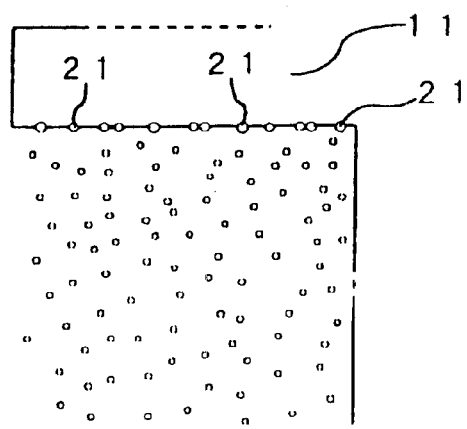
FIG. 3 is a sectional view of the piston which is the same as that shown in FIG. 2 except that the piston has been subjected to etching.

As shown in FIG. 3, the α-phase 31 formed on the surface of the ring groove 11 is eroded by chemical etching using a strong acid or strong alkali solution, to expose the internal eutectic silicon grains 21 from the surface.

The chemical etching is, if a strong acid solution is used as an etching solution, performed by dipping the piston raw material 1 in a nitric acid-hydrofluoric acid solution containing nitric acid (67.5%), hydrofluoric acid (50%), and water at a mixing ratio of 9: 2: 1 at room temperature for 15 to 60 sec.

Figure 5:
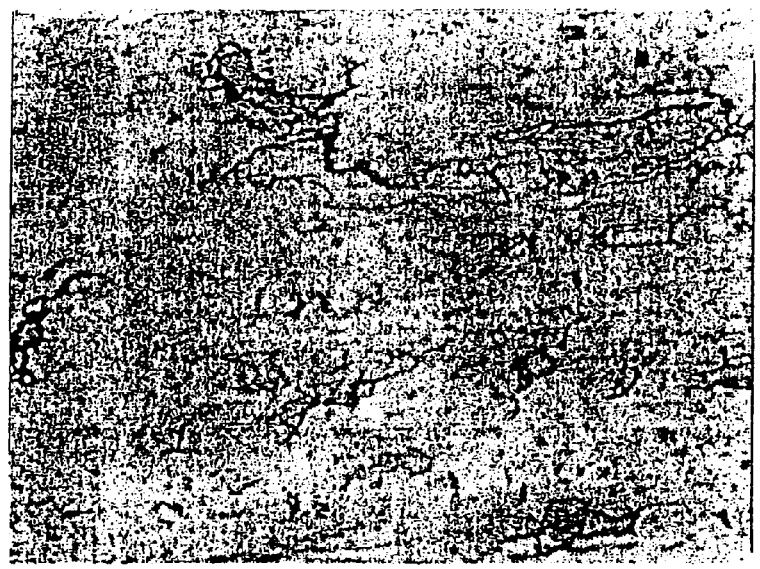
FIG. 5 is an SEM image showing an exposed surface after being subjected to mechanical machining.
Figure 6:
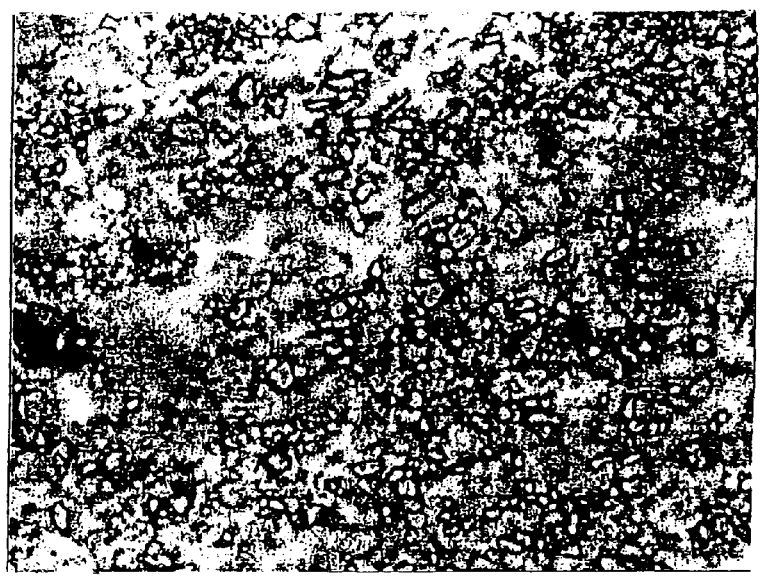
FIG. 6 is an SEM image showing the exposed surface after being subjected to etching.
Figure 7:
FIG. 7 is a binary image of FIG. 5.
Figure 8:
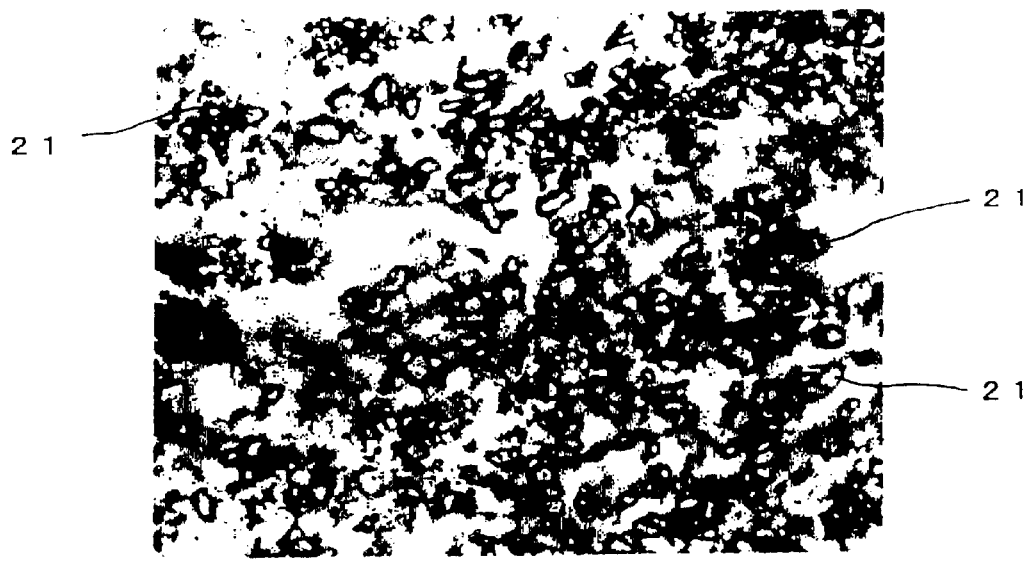
FIG. 8 is a binary image of FIG. 6.

FIGS. 5 and 7 are an SEM (scanning electron microscope) image of the machined surface on which the α-phase 31 is formed and a binary image thereof, respectively and the eutectic silicon grains 21 are not exposed from the surface. On the other hand, FIGS. 6 and 8 are an SEM image of the machined surface after chemical etching and a binary image thereof, respectively. As is apparent from FIGS. 6 and 8, after chemical etching, a large number of the eutectic silicon grains 21 are uniformly exposed from the surface.

Figure 4:
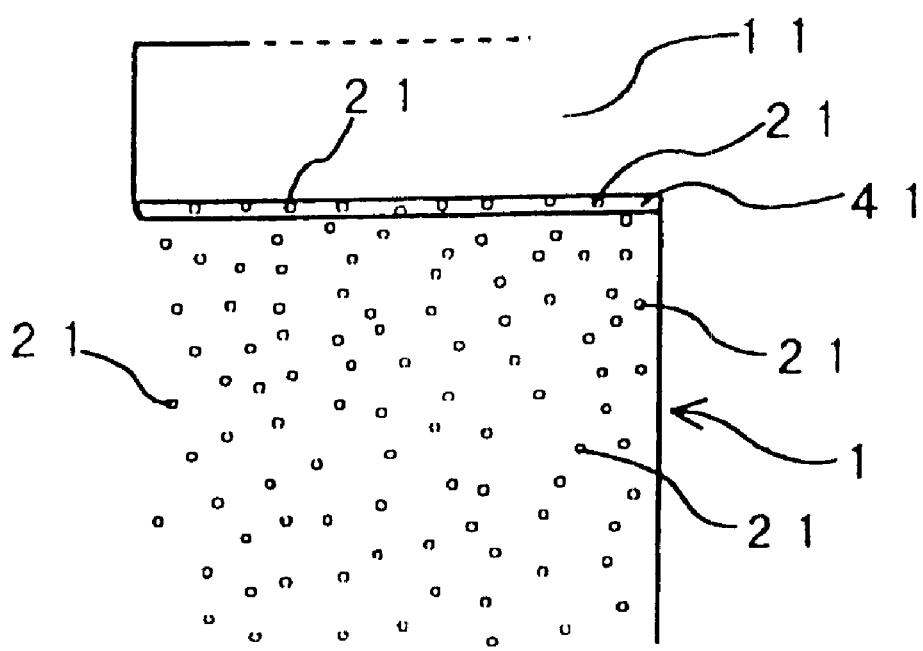
FIG. 4 is a sectional view of the piston which is the same as that shown in FIG. 3 except that the piston has been covered with a coating layer.

As shown in FIG. 4, the exposed surface is subjected to tin plating, to form a coating layer 41 having a thickness which is thin enough not to cover the eutectic silicon grains 21 exposed from the surface, for example, 2 to 3 µm. With this coating layer, the wear resistance of the eutectic silicon grains 21, which are fine hard grains, can be improved.

According to this embodiment, since the coating layer 41 is formed on the irregular surface from which the eutectic crystal grains of 21 are exposed, it can be forcibly bonded on the surface by the wedge effect.

According to this embodiment, since the eutectic silicon grains, which have a machinability higher than that of the primary crystal silicon grains while keeping a sufficient wear resistance, are exposed from the sliding plane, it is possible to improve the machinability of the sliding plane while keeping the sufficient wear resistance thereof.

In the above embodiment, the aluminum alloy member is formed from the aluminum-silicon based alloy material having the eutectic composition containing 12.0 wt % of silicon; however, the present invention is not limited thereto. For example, the aluminum alloy member may be formed from an aluminum-silicon based alloy material having a hypo-eutectic composition containing less than 12 wt % (for example, 5.5 to 6.5 wt %) of silicon.

In the case of using the above aluminum-silicon alloy material having a hypo-eutectic composition, the distribution amount of eutectic silicon grains precipitated becomes small; however, the aluminum alloy member formed by the material can exhibit the same effect as that described after it is subjected to the mechanical machining, etching, and coating steps.

In the above-described embodiment, the present invention has been described by an example of the production method for a piston. If a cylinder is produced by using the aluminum alloy member, the wear resistance of a sliding plane between the cylinder and a piston (piston ring) can be improved by subjecting the inner surface of the cylinder bore to cutting, chemical etching, and a coating treatment in the same manner as that described in the above-described embodiment.

The present invention exhibits the following effects:

(1) Since eutectic silicon grains are exposed from an exposed surface of the aluminum alloy member, it is possible to improve the machinability of the member as compared with the case using an aluminum alloy member in which hyper-eutectic silicon grains are exposed from an exposed surface, while keeping a sufficient wear resistance of the member.

(2) Since a coating layer is formed on the exposed surface from which the eutectic silicon grains are exposed, it is possible to further improve the wear resistance of the aluminum alloy member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An aluminum alloy member formed from an aluminum-silicon alloy by casting, comprising:
   eutectic silicon grains exposed from at least part of an exposed plane of said aluminum alloy member.

2. The aluminum alloy member according to claim 1, wherein said aluminum alloy member is a piston for an internal combustion engine.

3. The aluminum alloy member according to claim 2, wherein said eutectic silicon grains are exposed from a side portion, including at least a piston ring groove, of said piston.

4. The aluminum alloy member according to claim 1, wherein said aluminum alloy member is a cylinder of an internal combustion engine.

5. The aluminum alloy member according to claim 1, wherein a coating layer having a thickness nearly equal to or thinner than a diameter of each of said eutectic silicon grains is formed on said exposed plane from which said eutectic silicon grains are exposed.

6. The aluminum alloy member according to claim 2, wherein a coating layer having a thickness nearly equal to or thinner than a diameter of each of said eutectic silicon grains is formed on said exposed plane from which said eutectic silicon grains are exposed.

7. The aluminum alloy member according to claim 3, wherein a coating layer having a thickness nearly equal to or thinner than a diameter of each of said eutectic silicon grains is formed on said exposed plane from which said eutectic silicon grains are exposed.

8. The aluminum alloy member according to claim 4, wherein a coating layer having a thickness nearly equal to or thinner than a diameter of each of said eutectic silicon grains is formed on said exposed plane from which said eutectic silicon grains are exposed.

9. The aluminum alloy member according to claim 5, wherein said coating layer is a tin plating layer.

10. The aluminum alloy member according to claim 6, wherein said coating layer is a tin plating layer.

11. The aluminum alloy member according to claim 7, wherein said coating layer is a tin plating layer.

12. The aluminum alloy member according to claim 8, wherein said coating layer is a tin plating layer.

13. The aluminum alloy member according to claim 9, wherein the diameter of each of said eutectic silicon grains is in a range of 1 to 5 µm and a content of said eutectic silicon grains is in a range of 10 to 13 wt %, wherein the thickness of said tin plating layer is thin enough not to cover said eutectic silicon grains.

14. The aluminum alloy member according to claim 10, wherein the diameter of each of said eutectic silicon grains is in a range of 1 to 5 µm and a content of said eutectic silicon grains is in a range of 10 to 13 wt %, wherein the thickness of said tin plating layer is thin enough not to cover said eutectic silicon grains.

15. The aluminum alloy member according to claim 11, wherein the diameter of each of said eutectic silicon grains is in a range of 1 to 5 µm and a content of said eutectic silicon grains is in a range of 10 to 13 wt %, wherein the thickness of said tin plating layer is thin enough not to cover said eutectic silicon grains.

16. The aluminum alloy member according to claim 12, wherein the diameter of each of said eutectic silicon grains is in a range of 1 to 5 µm and a content of said eutectic silicon grains is in a range of 10 to 13 wt %, wherein the thickness of said tin plating layer is thin enough not to cover said eutectic silicon grains.

17. A method of producing an aluminum alloy member formed from an aluminum-silicon alloy, comprising the steps of:

casting an aluminum-silicon alloy having an eutectic composition to form an aluminum alloy raw material;

machining the surface of the aluminum alloy raw material formed by casting;

etching the machined surface, to expose eutectic silicon grains therefrom; and forming a coating layer on the surface from which the eutectic silicon grains are exposed.

18. The method of producing an aluminum alloy member according to claim 17, wherein a diameter of each of the eutectic silicon grains is in a range of 1 to 5 µm and a content of the eutectic silicon grains is in a range of 10 to 13 wt %, wherein a thickness of said coating layer is thin enough not to cover said eutectic silicon grains.

19. The method of producing an aluminum alloy member according to claim 17, wherein the etching is performed by eroding the machined surface with a nitric acid-hydrofluoric acid solution at room temperature.

20. A method of producing an aluminum alloy member formed from an aluminum-silicon alloy, comprising the steps of:

casting an aluminum-silicon alloy having a hypo-eutectic composition to form an aluminum alloy raw material;

machining the surface of the aluminum alloy raw material formed by casting;

etching the machined surface, to expose eutectic silicon grains therefrom; and forming a coating layer on the surface from which the eutectic silicon grains are exposed.

21. The method of producing an aluminum alloy member according to claim 20, wherein a diameter of each of the eutectic silicon grains is in a range of 1 to 5 µm and a content of the eutectic silicon grains is in a range of 10 to 13 wt %, wherein a thickness of said coating layer is thin enough not to cover said eutectic silicon grains.

22. The method of producing an aluminum alloy member according to claim 20, wherein the etching is performed by eroding the machined surface with a nitric acid-hydrofluoric acid solution at room temperature.

23. The aluminum alloy member according to claim 13, wherein the thickness of said tin plating layer is in a range of 2 to 3 µm.

24. The aluminum alloy member according to claim 14, wherein the thickness of said tin plating layer is in a range of 2 to 3 µm.

25. The aluminum alloy member according to claim 15, wherein the thickness of said tin plating layer is in a range of 2 to 3 µm.

26. The aluminum alloy member according to claim 16, wherein the thickness of said tin plating layer is in a range of 2 to 3 µm.

27. The method of producing an aluminum alloy member according to claim 18, wherein the thickness of said tin plating layer is in a range of 2 to 3 µm.

28. The method of producing an aluminum alloy member according to claim 21, wherein the thickness of said tin plating layer is in a range of 2 to 3 µm.

* * * * *